United States Patent [19]

Duck et al.

[11] Patent Number: 4,716,070

[45] Date of Patent: Dec. 29, 1987

[54] SEALANT COMPOSITIONS AND SEALED DOUBLE GLAZING UNITS

[75] Inventors: Edward W. Duck, Guangelloch; Ingolf Scheffler, Wiesloch, both of Fed. Rep. of Germany

[73] Assignee: Teroson G.m.b.H., Fed. Rep. of Germany

[21] Appl. No.: 845,281

[22] Filed: Mar. 28, 1986

[30] Foreign Application Priority Data

Mar. 28, 1985 [GB] United Kingdom ............... 8508114

[51] Int. Cl.$^4$ ............................................. C08G 18/62
[52] U.S. Cl. ................................. 428/192; 428/411.1; 428/422.8; 428/425.6; 428/425.8; 528/73; 528/75

[58] Field of Search ............... 528/75, 73; 428/425.6, 428/192, 411.1, 422.8, 425.8

[56] References Cited

U.S. PATENT DOCUMENTS 4,412,013 10/1983 Chang .................................. 528/75

Primary Examiner—Maurice J. Welsh
Attorney, Agent, or Firm—Jill H. Krafte; B. G. Newland

[57] ABSTRACT

A polyurethane sealant, particularly suitable for forming the seal around a double glazing unit, is formed by reacting an isocyanate component with a reactive component that is an isoprene polymer having terminal functional groups.

8 Claims, No Drawings

SEALANT COMPOSITIONS AND SEALED DOUBLE GLAZING UNITS

A double glazing unit often comprises two spaced apart glass panes sealed together around their edges by a seal that includes a metal or plastic spacer sealed between the panes around their edges. The spacer is generally sealed to the facing surfaces of the glass panes by a butyl rubber sealant and a polysulphide sealant is generally provided, outside the spacer, to seal across the entire width of the gap between the panes. The butyl rubber composition provides a barrier having desirably low moisture vapour or gas transmission properties, so as to prevent transmission of moisture vapour into the gap between the panes or, in the case of the more expensive units, or to provide a barrier to seal a dry inert gas inside this gap. The polysulphide composition provides an outermost seal of strong physical properties and adhesive qualities to retain dimensional strength and stability to the entire system.

In some modified systems either the butyl rubber sealant or the spacer or the polysulphide sealant might be omitted in order to cheapen manufacture.

The disadvantage of omitting the butyl sealant is that after a relatively short time in service moisture vapour tends to be transmitted through the seal, causing condensation and fogging of the inside surfaces and thus lack of transparency. The disadvantage of omitting the spacer and/or the polysulphide composition is that the system loses dimensional stability, i.e., the panes may exhibit creep when in the vertical position, or may become detached because of the lack of adhesive strength of the sealant-glass bond.

It is well known to provide polyurethane sealants comprising an isocyanate component and a reactive component that can react with the isocyanate component to form a polyurethane. The reactive component may comprise, for instance, a polyhydroxy compound.

It has recently been found that, in double glazing units, the polysulphide component can be replaced by a two-part polyurethane sealant system based on an $\alpha\Omega$ terminally bi-functional low molecular weight polybutadiene (e.g., where the functionality is a hydroxyl group) such as the commercially available material known as "Poly bd Resin" sold by Arco Chemical Company. Liquid polymers for use in the reactive component and that are sold under this trade name include the materials designated R45M and R45HT and are hydroxyl terminated homopolymers of butadiene having a number average molecular weight of around 2,800 and having, respectively, hydroxyl numbers of 42 and 46.

Polyurethane sealants formed using such polymers as reactive component can replace the polysulphide. They can have transmission properties better than the polysulphide but the vapour and gas transmission properties are still significantly worse than are available with butyl rubber sealants and so it is generally necessary to retain the conventional butyl rubber sealant in the double glazing unit.

It is theoretically possible to synthesise a low molecular weight $\alpha\Omega$ difunctional isobutene polymer where the functionality is a hydroxyl group (see for example J. P. Kennedy, B. Ivan, V. S. C. Chang in "Urethane Chemistry and Applications" by K. N. Edwards, ACS Symp. Series 172, p. 383, Am. Chem. Soc. Wash. 1981). However this synthesis is laborious and completely uneconomic for practical purposes in the manufacture of a sealant composition.

A polyurethane sealant according to the invention comprises (a) an isocyanate component and (b) a reactive component comprising a polymer having terminal functional groups that can react with the isocyanate component to form a polyurethane and is characterised in that the polymer having functional groups is an isoprene polymer.

At least 20%, preferably at least 50% and most preferably at least 75%, by weight of the monomer or monomers from which the polymer is made must be isoprene and best results are generally obtained when the polymer is substantially a homopolymer of isoprene. Comonomers that can be incorporated into the polymer can include any suitable copolymerisable monomers, generally selected from olefin monomers, styrene monomers, acrylic nitrile monomers, acrylic ester monomers, vinyl monomers and vinylidene monomers. A preferred olefin monomer is butadiene. A preferred styrene monomer is styrene itself but other styrenes such as methyl styrene can be used. A preferred acrylic nitrile monomer is acrylonitrile. A preferred vinylidene monomer is vinylidene chloride. Vinyl chloride can be used. Preferred acrylic ester monomers include esters of acrylic or methacrylic acid, especially glycidyl esters (pereferably glycidyl methacrylate) and Cl-10, most preferably C2-6 alkyl acrylates or methacrylates, most preferably isobutyl methacrylate and n-butyl methacrylate.

The polymer generally has a molecular weight in the range 1,000 to 15,000 as determined on the basis of end group analysis.

The isoprene units may be in one or any of the configurations, namely cis or trans 1.4, 1.2, or 3.4.

The polymer should have terminal functional groups of the type that can react with isocyanate to form a polyurethane. The functionality is generally from 2 to 4, most preferably 2.1 to 3 as determined by functional end group analysis and number average molecular weight. The functional groups are preferably hydroxyl and such polymers can conveniently be made by free radical polymerisation using hydrogen peroxide as initiator. However other initiators that generate hydroxyl functionality may be used either alone or in combination with hydroxy-functional chain transfer agents.

Instead of having hydroxyl groups as the terminal functional groups it is also possible to have other terminal functional groups that can react to form a polyurethane, for instance carboxylic acid groups, amino groups (primary, secondary, or tertiary where any substituents are preferably alkyl), isocyanato groups (-NCO) or epoxide groups. These alternative functional groups can be introduced in analogous manner, for instance using carboxy functional or amino functional initiators, e.g., the azo type, or carboxy functional or amino functional chain transfer agents, e.g, of the mercaptan or disulphide type.

The homopolymerisation or copolymerisation provides the backbone for the reactive polymer but it is often preferrred to epoxidise part of the unsaturation in the backbone chain of the polydiene portion thus increasing short chain branching, as this is found to improve (reduce) moisture vapor and gas transmission. The degree of epoxidation of the backbone is preferably at least 25% and most preferably is around 50%, for instance 40 to 60%.

The reactive component may include one or more other compounds that can react with the isocyanate to form a polyurethane. Other polymeric material having terminal functional groups can be included but preferably any additional reactive material in the reactive component b is a low molecular weight diol or triol, generally in an amount of not more than 50% and most preferably not more than 10% by weight of the component b, and is generally present as a reactive diluent, for instance to adjust reactivity and/or to improve the properties of the composition before or after formation of the polyurethane. The low molecular weight product generally has a molecular weight below 1,000, preferably below 200. It may be an aliphatic diol or triol such as ethylene glycol, diethylene glycol, glycerol, trimethylol propane or, preferably, 1,4-butanediol.

The isocyanate component is generally a liquid product that is based on a diisocyanate or a polyisocyanate and these may be any of the materials that are suitable for use in the manufacture of polyurethane sealants. Suitable isocyanates include liquified diphenyl methane diisocyanate (MDI), TDI, meta- or para TMXDI, xylenediisocyanate, para phenylenediisocyanate, 1,3-bis(isocyanatomethyl)d-benzene or aliphatic or cycloaliphatic di- or triisocyanates. Carbodiimide modified MDI or other isocyanates and liquid isocyanate terminated prepolymers of MDI or the other isocyanates may be used. Thus the isocyanate component may be a reaction product of a stoichimetric excess of one or more of the isocyanates with one or more of the low molecular weight diols or triols discussed above or with a hydroxyl containing polymer, preferably an isoprene polymer having terminal hydroxy groups as discussed above, or a blend of a polymer with a low molecular weight diol or triol.

The polyurethane sealant may be formed by blending all the ingredients simultaneously but preferably components a and b are formulated separately and are combined at the point of use. Reaction preferably occurs at room temperature upon intermixing of the components.

Either or both components may include conventional additives for adjusting the flow properties of the composition before curing or for adjusting the mechanical or other properties of the cured seal. Suitable additives include silanes, fumed silica such as the material sold under the trade name Aerosil, pigments such as thermal black, antioxidants and antiozonants, fillers such as whiting, ground or precipitated calcium carbonate or barium sulphate, for instance the materials sold under the trade names Winnofil SP and Omya BSH, and plasticizers, preferably phthalate plasticizers such as the materials sold under the trade names Santicizer 160 and 278, and polyurethane catalysts such as the materials sold under the trade name T12.

The sealant according to the invention may be used for sealing together surfaces wherever a seal having low moisture vapour and gas transmission is required and is of particular value for use as part or all of the seal in a double glazing unit comprising two spaced apart glass panes sealed together around their edges by a seal. Generally the seal includes a metal or plastic spacer. The seal formed from the novel polyurethane sealant may serve as the only effective moisture and gas barrier seal in the unit and thus may replace both the polysulphide and the butyl rubber seals in conventional units.

The invention is illustrated by the following examples.

EXAMPLE 1

A two part polyurethane sealant is prepared from parts A and B below. Part A and B are mixed in a proportion of 10 parts by weight of part A to 1 part by weight of part B.

|  | Weight % |
|---|---|
| Part A | |
| (1) Terminally functional dihydroxy copolymer of isoprene with isobutyl methacrylate (OH value 0.8 meg/g., 10 wt % iBuMA) | 20.0 |
| (2) 1,4 butane diol | 0.10 |
| (3) Silane A 189 | 0.50 |
| (4) Santicizer 160 | 10.00 |
| (5) Winnofil SP (dried) | 20.00 |
| (6) Omya BSH | 38.40 |
| (7) Paste containing antioxidants and antiozonants* | 11.00 |
| Part B | |
| (1) Isonate 143 L (MDI) | 29.90 |
| (2) Polymer as for Part A | 21.50 |
| (3) Santicizer 160 | 19.00 |
| (4) Santicizer 278 | 17.60 |
| (5) Thermal black | 10.00 |
| (6) Aerosil R 972 | 1.00 |
| (7) Solution of 10 wt % T12 in Santicizer 160 | 1.00 |

EXAMPLE 2

A two part polyurethane sealant of composition similar to Example 1 is prepared except that the polymer is an $\alpha\Omega$ dihydroxy homopolymer of isoprene in which 50% of the double bonds are epoxidised.

This material exhibits very low permeability to gases and moisture.

We claim:

1. A double glazing unit comprising two spaced apart glass panes sealed together around their edges by a seal obtained by reacting (a) an isocyanate component and (b) a reactive component comprising a polymer having terminal functional groups that can react with the isocyanate component to form a polyurethane, wherein the polymer having functional groups is an isoprene polymer.

2. A unit according to claim 1 in which the polymer is formed of 20-100% isoprene and 0 to 80% copolymerizable monomer selected from the group consisting of olefin monomer, styrene monomer, acrylic nitrile monomer, acrylic ester monomer, vinyl monomer and vinylidene monomer, and has molecular weight of 1,000 to 15,000.

3. A unit according to claim 1 in which the copolymerizable monomer is selected from the group consisting of butadiene, styrene, acrylonitrile, vinylidene chloride, isobutyl methacrylate, n-butyl methacrylate and glycidyl methacrylate.

4. A unit according to claim 1 in which the terminal functional groups are selected from the group consisting of hydroxyl, amine, isocyanate, epoxide and carboxylic acid groups.

5. A unit according to claim 1 in which the functionality of the polymer is from 2 to 4.

6. A unit according to claim 1 in which the polymer is epoxidized.

7. A unit according to claim 1 in which the seal includes a metal or plastic spacer.

8. A unit according to claim 1 in which the seal is the only effective moisture and gas barrier seal in the unit.

* * * * *